(12) United States Patent
Taniguchi (10) Patent No.: US 11,342,120 B2
(45) Date of Patent: May 24, 2022

(54) MULTILAYER CERAMIC CAPACITOR AND MANUFACTURING METHOD OF MULTILAYER CERAMIC CAPACITOR

(71) Applicant: TAIYO YUDEN CO., LTD., Tokyo (JP)

(72) Inventor: Katsuya Taniguchi, Takasaki (JP)

(73) Assignee: TAIYO YUDEN CO., LTD., Tokyo (JP)

( * ) Notice: Subject to any disclaimer, the term of this patent is extended or adjusted under 35 U.S.C. 154(b) by 67 days.

(21) Appl. No.: 16/409,458

(22) Filed: May 10, 2019

(65) Prior Publication Data

US 2019/0355519 A1    Nov. 21, 2019

(30) Foreign Application Priority Data

May 17, 2018    (JP) .............................. JP2018-095454

(51) Int. Cl.
| | |
|---|---|
| H01G 4/30 | (2006.01) |
| H01G 4/12 | (2006.01) |
| H01G 4/012 | (2006.01) |
| H01G 4/228 | (2006.01) |

(52) U.S. Cl.
CPC .............. *H01G 4/30* (2013.01); *H01G 4/012* (2013.01); *H01G 4/12* (2013.01); *H01G 4/228* (2013.01)

(58) Field of Classification Search
CPC ............ H01G 4/30; H01G 4/228; H01G 4/12; H01G 4/012
USPC ......... 361/301.4, 321.1, 321.2, 321.3, 321.4, 361/311, 320
See application file for complete search history.

(56) References Cited

U.S. PATENT DOCUMENTS

| | | | |
|---|---|---|---|
| 2007/0225154 A1* | 9/2007 | Yanagida | ............ C04B 35/4682 501/139 |
| 2012/0147522 A1 | 6/2012 | Kim et al. | |
| 2012/0234462 A1 | 9/2012 | Matsui et al. | |

(Continued)

FOREIGN PATENT DOCUMENTS

| | | |
|---|---|---|
| JP | 2011124429 A | 6/2011 |
| JP | 2012129506 A | 7/2012 |

(Continued)

OTHER PUBLICATIONS

A Notice of Reasons for Refusal issued by the Japanese Patent Office, dated Nov. 16, 2021, for Japanese counterpart application No. 2018-095454. (4 pages).

(Continued)

*Primary Examiner* — Arun Ramaswamy
(74) *Attorney, Agent, or Firm* — Law Office of Katsuhiro Arai (57) ABSTRACT

A multilayer ceramic capacitor includes: a multilayer structure in which each of a plurality of dielectric layers and each of a plurality of internal electrode layers are alternately stacked, wherein a concentration of a rare earth element in an active region with respect to a main component ceramic of the active region is equal to or more than a concentration of a rare earth element in at least a part of a protective region with respect to a main component ceramic of the protective region, wherein an average ionic radius of the rare earth element of the at least a part of the protective region is equal to or less than an average ionic radius of the rare earth element in the active region.

9 Claims, 5 Drawing Sheets

(56) References Cited

U.S. PATENT DOCUMENTS

| | | | |
|---|---|---|---|
| 2013/0222972 A1* | 8/2013 | Saito | H05K 3/1291 |
| | | | 361/301.4 |
| 2015/0049413 A1 | 2/2015 | Wada et al. | |
| 2015/0155100 A1 | 6/2015 | Morita | |
| 2018/0108482 A1 | 4/2018 | Kogure et al. | |

FOREIGN PATENT DOCUMENTS

| | | | |
|---|---|---|---|
| JP | 2012209539 A | 10/2012 | |
| JP | 2015109475 A | 6/2015 | |
| JP | 2017011172 A | 1/2017 | |
| JP | 2018067566 A | 4/2018 | |
| WO | 2013145423 A1 | 10/2013 | |

OTHER PUBLICATIONS

A Notice of Reasons for Refusal issued by the Japanese Patent Office, dated Apr. 5, 2022, for Japanese counterpart application No. 2018-095454. (6 pages).

* cited by examiner

MULTILAYER CERAMIC CAPACITOR AND MANUFACTURING METHOD OF MULTILAYER CERAMIC CAPACITOR

CROSS-REFERENCE TO RELATED APPLICATION

This application is based upon and claims the benefit of priority of the prior Japanese Patent Application No. 2018-095454, filed on May 17, 2018, the entire contents of which are incorporated herein by reference.

FIELD

A certain aspect of the present invention relates to a multilayer ceramic capacitor and a manufacturing method of the multilayer ceramic capacitor.

BACKGROUND

Multilayer ceramic capacitors include an active region and a protective region. The active region has a structure in which one set of internal electrodes connected to one external electrode and another set of internal electrodes connected to the other external electrode face with each other and has an electrical capacity. The protective region has cover layers sandwiching the active region in an up-down direction and a side margin region sandwiching the active region in a lateral direction. Densifying of the protective region in a firing process may be slower than that of the active region and humidity resistance of the protective region may be degraded, because a diffusion amount of a metal of the protective region is smaller than that of the internal electrode and a density of a compact before the firing is small. Therefore, in order to promote the densifying of the protective region, the active region is fired in a temperature higher than an optimal firing temperature of the active region.

SUMMARY OF THE INVENTION

The present invention has a purpose of providing a multilayer ceramic capacitor and a manufacturing method of the multilayer ceramic capacitor that are capable of suppressing degradation of characteristic and improving sintering characteristic of a protective region.

According to an aspect of the present invention, there is provided a multilayer ceramic capacitor including: a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing with the second end face, wherein a concentration of a rare earth element in an active region with respect to a main component ceramic of the active region is equal to or more than a concentration of a rare earth element in at least a part of a protective region with respect to a main component ceramic of the protective region, wherein the active region is a region in which a set of internal electrode layers exposed to the first end face of the multilayer structure face with another set of internal electrode layers exposed to the second end face of the multilayer structure, wherein the protective region includes a cover layer and a side margin, wherein the cover layer is provided on at least one of an upper face and a lower face of the multilayer structure in a stacking direction of the multilayer structure, a main component of the cover layer being a same as that of the dielectric layers, wherein, in the multilayer structure, the side margin covers edge portions to which the plurality of internal electrode layers extend toward two side faces other than the first end face and the second end face, wherein an average ionic radius of the rare earth element of the at least a part of the protective region is equal to or less than an average ionic radius of the rare earth element in the active region.

According to another aspect of the present invention, there is provided a manufacturing method of a multilayer ceramic capacitor including: a first process of forming a stack unit by providing a pattern of metal conductive paste on a green sheet having grains of main component ceramic; a second process of stacking a plurality of the stack units formed in the first process so that positions of the patterns are alternately shifted to each other; a third process of forming two end faces and two side faces in a ceramic multilayer structure obtained in the second process, by cutting the ceramic multilayer structure, the two end faces being faces to which a plurality of the patterns are alternately exposed, the two side faces being faces to which all of the patterns are exposed; and a fourth process of providing side margin sheets on the two side faces, the side margin sheet including grains of main component ceramic and firing the ceramic multilayer structure together with the side margin sheets, wherein a concentration of a rare earth element in the green sheet with respect to the main component ceramic of the green sheet is equal to or more than a concentration of a rare earth element in the side margin sheet with respect to the main component ceramic of the side margin sheet, wherein an average ionic radius of the rare earth element of the side margin sheet is equal to or less than an average ionic radius of the rare earth element of the green sheet.

According to another aspect of the present invention, there is provided a manufacturing method of a multilayer ceramic capacitor including: a first process of forming a stack unit by providing a pattern of metal conductive paste on a green sheet having grains of main component ceramic; a second process of stacking a plurality of the stack units formed in the first process so that positions of the patterns are alternately shifted to each other; and a third process of providing cover sheets on an upper face and a lower face in a stacking direction of a ceramic multilayer structure obtained in the second process, the cover sheets including grains of main component ceramic, wherein a concentration of a rare earth element in the green sheet with respect to the main component ceramic of the green sheet is equal to or more than a concentration of a rare earth element in the cover sheets with respect to the main component ceramic of the cover sheets, wherein an average ionic radius of the rare earth element of the cover sheets is equal to or less than an average ionic radius of the rare earth element of the green sheet.

DETAILED DESCRIPTION

When the firing temperature is high, a continuity modulus of the internal electrode layer may be degraded. The continuity modulus of the internal electrode has large influence on reliability of the multilayer ceramic capacitor. Therefore, when the firing temperature is high, sufficient reliability may not be necessarily achieved.

In order to improve the sintering characteristic of the protective region without increasing the firing temperature, Si (silicon) or a glass component acting as a sintering assistant is added to the protective region (for example, see Japanese Patent Application Publication No. 2011-124429). The glass component is such as silicate glass, borate glass, borosilicate glass, phosphate glass, or the like including an alkali metal component such as Li (lithium), Na (sodium), K (potassium) or an alkali earth metal component such as Ca (calcium), Ba (barium), Sr (strontium). However, with the method, diffusion may occur because of a difference between the composition of the active region and the composition of the protective region. Si or the glass component acting as the sintering assistant may cause excessive grain growth or reduction of the dielectric constant, when Si or the glass component diffuses into the active region. Alternatively, there are methods for adding an element such as Mn (manganese) or Mg (magnesium) to promote densifying (for example, see Japanese Patent Application Publication No. 2017-011172). However, Mn or Mg may reduce an efficient capacity of the active region. Therefore, when the additive element to promote sintering of the protective region diffuses into the active region, the characteristic of the multilayer ceramic capacitor may be degraded.

A description will be given of an embodiment with reference to the accompanying drawings.

Embodiment

Figure 1:
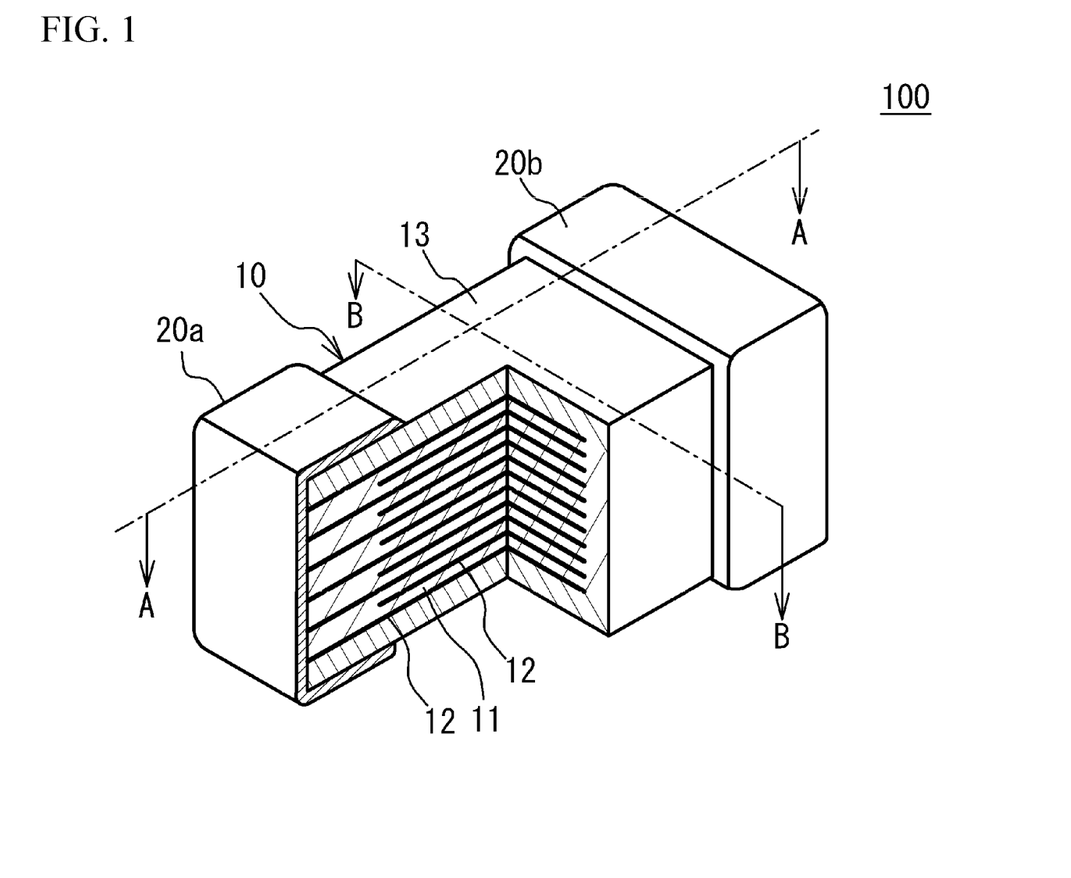
FIG. 1 illustrates a partial perspective view of a multilayer ceramic capacitor.
Figure 2:
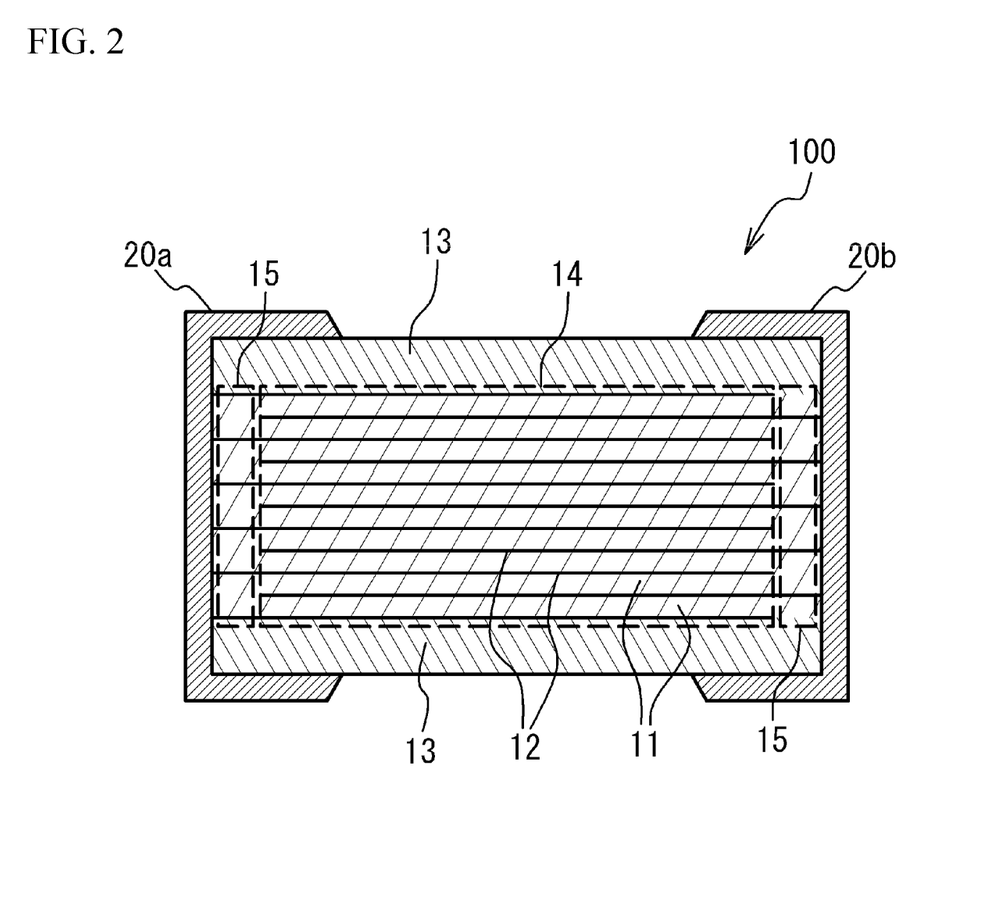
FIG. 2 illustrates a cross sectional view taken along a line A-A of FIG. 1.
Figure 3:
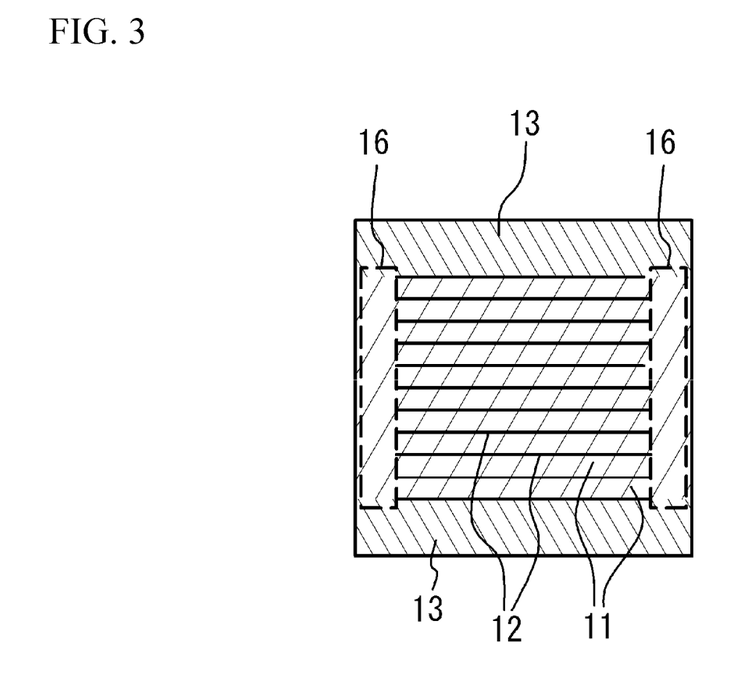
FIG. 3 illustrates a cross sectional view taken along a line B-B of FIG. 1.

FIG. 1 illustrates a partial perspective view of a multilayer ceramic capacitor 100 in accordance with an embodiment. FIG. 2 illustrates a cross sectional view taken along a line A-A of FIG. 1. FIG. 3 illustrates a cross sectional view taken along a line B-B of FIG. 1. As illustrated in FIG. 1 to FIG. 3, the multilayer ceramic capacitor 100 includes a multilayer chip 10 having a rectangular parallelepiped shape, and a pair of external electrodes 20a and 20b that are respectively provided at two end faces of the multilayer chip 10 facing each other. In four faces other than the two end faces of the multilayer chip 10, two faces other than an upper face and a lower face of the multilayer chip 10 in a stacking direction are referred to as side faces. The external electrodes 20a and 20b extend to the upper face, the lower face and the two side faces of the multilayer chip 10. However, the external electrodes 20a and 20b are spaced from each other.

The multilayer chip 10 has a structure designed to have dielectric layers 11 and internal electrode layers 12 alternately stacked. The dielectric layer 11 includes ceramic material acting as a dielectric material. The internal electrode layers 12 include a base metal material. End edges of the internal electrode layers 12 are alternately exposed to a first end face of the multilayer chip 10 and a second end face of the multilayer chip 10 that is different from the first end face. In the embodiment, the first end face faces with the second end face. The external electrode 20a is provided on the first end face. The external electrode 20b is provided on the second end face. Thus, the internal electrode layers 12 are alternately conducted to the external electrode 20a and the external electrode 20b. Thus, the multilayer ceramic capacitor 100 has a structure in which a plurality of dielectric layers 11 are stacked and each two of the dielectric layers 11 sandwich the internal electrode layer 12. In the multilayer chip 10, the internal electrode layer 12 is positioned at an outermost layer. The upper face and the lower face of the multilayer chip 10 that are the internal electrode layers 12 are covered by cover layers 13. A main component of the cover layer 13 is a ceramic material. For example, a main component of the cover layer 13 is the same as that of the dielectric layer 11.

For example, the multilayer ceramic capacitor 100 may have a length of 0.25 mm, a width of 0.125 mm and a height of 0.125 mm. The multilayer ceramic capacitor 100 may have a length of 0.4 mm, a width of 0.2 mm and a height of 0.2 mm. The multilayer ceramic capacitor 100 may have a length of 0.6 mm, a width of 0.3 mm and a height of 0.3 mm. The multilayer ceramic capacitor 100 may have a length of 1.0 mm, a width of 0.5 mm and a height of 0.5 mm. The multilayer ceramic capacitor 100 may have a length of 3.2 mm, a width of 1.6 mm and a height of 1.6 mm. The multilayer ceramic capacitor 100 may have a length of 4.5 mm, a width of 3.2 mm and a height of 2.5 mm. However, the size of the multilayer ceramic capacitor 100 is not limited.

A main component of the internal electrode layers 12 is a base metal such as nickel (Ni), copper (Cu), tin (Sn) or the like. The internal electrode layers 12 may be made of a noble metal such as platinum (Pt), palladium (Pd), silver (Ag), gold (Au) or alloy thereof. An average thickness of the internal electrode layer 12 is, for example, 1 μm or less. The dielectric layers 11 are mainly composed of a ceramic material that is expressed by a general formula $ABO_3$ and has a perovskite structure. The perovskite structure includes $ABO_{3-\alpha}$ having an off-stoichiometric composition. For example, the ceramic material is such as $BaTiO_3$ (barium titanate), $CaZrO_3$ (calcium zirconate), $CaTiO_3$ (calcium titanate), $SrTiO_3$ (strontium titanate), $Ba_{1-x-y}Ca_xSr_yTi_{1-z}Zr_zO_3$ ($0 \leq x \leq 1$, $0 \leq y \leq 1$, $0 \leq z \leq 1$) having a perovskite structure. An average thickness of the dielectric layer 11 is, for example, 1 μm or less.

As illustrated in FIG. 2, a region, in which a set of the internal electrode layers 12 connected to the external electrode 20a face another set of the internal electrode layers 12 connected to the external electrode 20b, is a region generating electrical capacity in the multilayer ceramic capacitor 100. And so, the region is referred to as an active region 14. That is, the active region 14 is a region in which the internal electrode layers 12 next to each other are connected to different external electrodes face each other.

A region, in which the internal electrode layers 12 connected to the external electrode 20a face with each other without sandwiching the internal electrode layer 12 connected to the external electrode 20b, is referred to as an end margin region 15. A region, in which the internal electrode layers 12 connected to the external electrode 20b face with each other without sandwiching the internal electrode layer 12 connected to the external electrode 20a is another end margin region 15. That is, the end margin region 15 is a region in which a set of the internal electrode layers 12 connected to one external electrode face with each other without sandwiching the internal electrode layer 12 connected to the other external electrode. The end margin region 15 is a region that does not generate electrical capacity in the multilayer ceramic capacitor 100.

As illustrated in FIG. 3, a region of the multilayer chip 10 from the two sides thereof to the internal electrode layers 12 is referred to as a side margin region 16. That is, the side margin region 16 is a region covering edges of the stacked internal electrode layers 12 in the extension direction toward the two side faces. The side margin region 16 does not generate electrical capacity. In the following description, the cover layers 13 and the side margin region 16 that surround the active region 14 without generating the electrical capacity may be called as a protective region.

It is possible to form the active region 14 and the protective region by sintering a powder material. Densifying of the protective region in a firing process may be slower than that of the active region 14 and humidity resistance of the protective region may be degraded, because a diffusion amount of a metal structuring the internal electrode layer 12 in the protective region is smaller than that in the active region 14 and a density of a compact before the firing is small. Therefore, in order to promote the densifying of the protective region, the active region 14 is fired in a temperature higher than an optimal firing temperature of the active region 14. However, when the firing temperature is high, a continuity modulus of the internal electrode layer 12 may be degraded. The continuity modulus of the internal electrode layer 12 has large influence on the reliability of the multilayer ceramic capacitor 100. Therefore, when the firing temperature is high, sufficient reliability may not be necessarily achieved.

In order to improve the sintering characteristic of the protective region without increasing the firing temperature, Si or a glass component acting as a sintering assistant may be added to the protective region. However, with the method, diffusion may occur because of a difference between the composition of the active region 14 and the composition of the protective region. Si or the glass component acting as the sintering assistant may cause excessive grain growth or reduction of the dielectric constant, when Si or the glass component diffuses into the active region 14. Alternatively, there are methods for adding an element such as Mn or Mg to promote densifying. However, Mn or Mg may reduce an efficient capacity of the active region 14. Therefore, when the additive element to promote sintering of the protective region diffuses into the active region 14, the characteristic of the multilayer ceramic capacitor 100 may be degraded.

And so, it is thought that the densifying of the active region 14 is delayed. When the densifying of the active region 14 is delayed, it is possible to reduce the difference of the densifying between the active region 14 and the protective region. It is therefore possible to improve the sintering characteristic of the protective region without increasing the firing temperature. The embodiment focuses on a rare earth element. The rare earth element is added in order to secure the reliability of the multilayer ceramic capacitor 100. The rare earth element improves the reliability of the multilayer ceramic capacitor 100. On the other hand, the rare earth element increases the temperature for terminating the densifying and delays the densifying. And so, in the embodiment, a concentration of an added rare earth element is determined. In concrete, the concentration of the rare earth element in the active region 14 is equal to or more than the concentration of the rare earth element in the protective region. Thus, it is possible to reduce the difference of the densifying of the active region 14 and the densifying of the protective region. In this case, even if the firing temperature is not excessively increased, it is possible to densify both the active region 14 and the protective region.

It is therefore possible to improve the humidity resistance while the reduction of the continuity modulus of the internal electrode layer 12 is suppressed. It is not necessary to add the element to promote the densifying of the protective region. Therefore, the diffusion of the additive element added to the active region 14 is suppressed. It is therefore possible to suppress characteristic degradation of the multilayer ceramic capacitor 100. The concentration of the rare earth element is a concentration with respect to the main component ceramic. Therefore, the concentration of the rare earth element is atm % on a presumption that the concentration of the B site element of $ABO_3$ of the main component ceramic is 100 atm %.

However, when the grain growth is promoted in the protective region, the grain growth is promoted in a part of the active region 14 near the protective region. In this case, the reliability may be degraded. And so, the embodiment focuses on an average ionic radius of the rare earth element. When the ionic radius of the rare earth element is small, a ratio of the rare earth element that is solid-solved in the B site having a relatively small ionic radius increases. When the ionic radius of the rare earth element is large, a ratio of the rare earth element that is solid-solved in the A site having a relatively large ionic radius increases. In $ABO_3$ of the perovskite structure, a diffusion speed in the A site is higher than a diffusion speed in the B site because of a crystal structure of the perovskite structure. Therefore, when the rare earth element having a small ionic radius is added, the gain growth tends to be suppressed. And so, in the embodiment, the average ionic radius of the rare earth element is determined. In concrete, the average ionic radius of the rare earth element in the protective region is equal to or less than the average ionic radius of the rare earth element in the active region 14. In this case, the grain growth of the protective region is suppressed. Thereby, the grain growth of the part of the active region 14 near the protective region is suppressed. It is therefore possible to improve the reliability of the active region 14. When one type of the rare earth element is added, the average ionic radius means an ionic radius of the rare earth element. When two or more types of the rare earth elements are added, the average ionic radius means an arithmetic average of the concentrations of the rare earth elements on the basis of the concentrations ratio.

Y (yttrium), La (lanthanum), Ce (cerium), Pr (praseodymium), Nd (neodymium), Sm (samarium), Eu (europium), Gd (gadolinium), Tb (terbium), Dy (dysprosium), Ho (holmium), Er (erbium), Tm (thulium), Yb (ytterbium) or the like can be used as the rare earth element. Table 1 shows ionic radiuses of rare earth elements of which a valence is 3 and of which a coordination number is 6. Exhibition of Table 1 is "R. D. Shannon, Acta Crystallogr., A32, 751(1976)".

TABLE 1

| | | IONIC RADIUS (Å) | |
|---|---|---|---|
| | VALENCE | COORDINATION NUMBER IS 6 | COORDINATION NUMBER IS 12 |
| Ba | +2 | | 1.610 |
| Ti | +4 | 0.605 | |
| La | +3 | 1.032 | |
| Ce | +3 | 1.010 | |
| Pr | +3 | 0.990 | |
| Nd | +3 | 0.983 | |
| Sm | +3 | 0.958 | |
| Eu | +3 | 0.947 | |
| Gd | +3 | 0.938 | |
| Tb | +3 | 0.923 | |

TABLE 1-continued

| | | IONIC RADIUS (Å) | |
| --- | --- | --- | --- |
| | VALENCE | COORDINATION NUMBER IS 6 | COORDINATION NUMBER IS 12 |
| Dy | +3 | 0.912 | |
| Ho | +3 | 0.901 | |
| Y | +3 | 0.900 | |
| Er | +3 | 0.890 | |
| Tm | +3 | 0.880 | |
| Yb | +3 | 0.868 | |

When the concentration of the rare earth element is excessively small, sufficient reliability may not be necessarily achieved. And so, it is preferable that the concentration of the rare earth element has a lower limit. For example, it is preferable that the concentration of the rare earth element in the active region 14 is 0.5 atm % or more. It is more preferable that the concentration of the rare earth element in the active region 14 is 0.7 atm % or more. It is preferable that the concentration of the rare earth element in the protective region is 0.5 atm % or more. It is more preferable that the rare earth element in the protective region is 0.7 atm % or more. On the other hand, when the concentration of the rare earth element is excessively high, the sintering characteristic itself may be degraded and it may be necessary to form the internal electrode layer 12 by a firing of a high temperature which is not preferable for high continuity modulus of the internal electrode layer 12. And so, it is preferable that the concentration of the rare earth element has an upper limit. It is preferable that the concentration of the rare earth element in the active region 14 is 2.0 atm % or less. It is more preferable that the concentration of the rare earth element in the active region 14 is 1.8 atm % or less. It is preferable that the concentration of the rare earth element in the protective region is 2.0 atm % or less. It is more preferable that the concentration of the rare earth element is 1.8 atm % or less.

When a difference between the concentration of the rare earth element in the active region 14 and the concentration of the rare earth element in the protective region is excessively large, the diffusion of the rare earth element from the active region 14 to the protective region is remarkable and the reliability of the active region 14 near the protective region may be degraded. And so, it is preferable that the difference has an upper limit. In concrete, it is preferable that the difference between the concentration (atm %) of the rare earth element in the active region 14 and the concentration (atm %) of the rare earth element in the protective region is 0 or more and 0.5 or less.

The rare earth element included in the active region 14 and the protective region is not limited. However, it is preferable that the rare earth element can be substitutionally solid-solved in both the A site and the B site. For example, ionic radiuses of La, Ce, Pr, Nd, Sm and Eu are large, when the main component ceramic is BaTiO$_3$. Therefore, La, Ce, Pr, Nd, Sm and Eu tend to be substitutionally solid-solved in the A site. Therefore, even if these rare earth element having a large ionic radius are added together with an element such as Er or Yb having relatively small ionic radius, it is difficult to achieve preferable balance between the solid-solution in the A site and the solid-solution in the B site. And, it is difficult to achieve high reliability. And so, it is preferable that the rare earth element included in the active region 14 and the protective region is at least one of Gd, Tb, Dy, Ho, Er, Y and Yb. For example, when one type of rare earth elements is used, it is preferable that the rare earth element is Dy, Ho, Er or Y. When an element having a large ionic radius is added together with an element having a small ionic radius, it is preferable that, among Gd, Tb, Dy, Ho, Er, Y and Yb, an element having a large ionic radius and an element having a small ionic radius are added together with each other (for example, Gd and Yb).

In the above-mentioned example, (the concentration of the rare earth element in the active region 14) is equal to or more than (the concentration of the rare earth element in the protective region). And (an average ionic radius of the rare earth element in the active region 14) is equal to or more than (an average ionic radius of the rare earth element in the protective region). However, the relationship is not limited. At least a part of the protective region satisfies the above-mentioned formulas. Alternatively, a whole of at least one of the cover layer 13 and the side margin region 16 satisfies the above-mentioned formulas.

Figure 4:
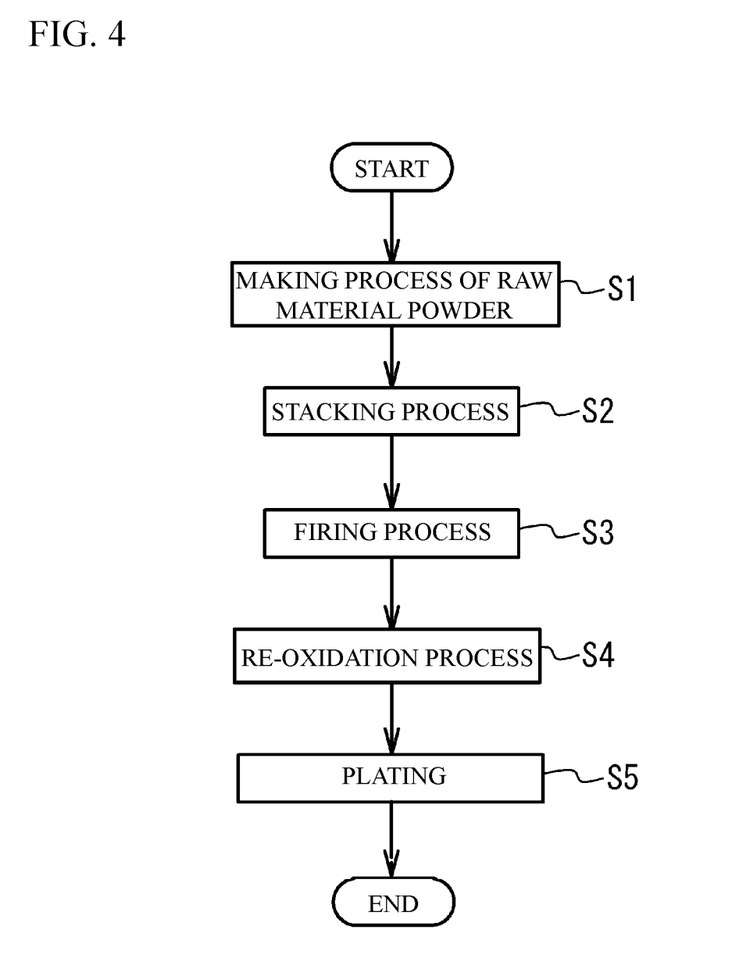
FIG. 4 illustrates a manufacturing method of a multilayer ceramic capacitor.

Next, a description will be given of a manufacturing method of the multilayer ceramic capacitor 100. FIG. 4 illustrates a manufacturing method of the multilayer ceramic capacitor 100.

(Making Process of Raw Material Powder)

A dielectric material for forming the dielectric layer 11 is prepared. Generally, an A site element and a B site element are included in the dielectric layer 11 in a sintered phase of grains of ABO$_3$. For example, BaTiO$_3$ is tetragonal compound having a perovskite structure and has a high dielectric constant. Generally, BaTiO$_3$ is obtained by reacting a titanium material such as titanium dioxide with a barium material such as barium carbonate and synthesizing barium titanate. Various methods can be used as a synthesizing method of the ceramic structuring the dielectric layer 11. For example, a solid-phase method, a sol-gel method, a hydrothermal method or the like can be used.

Additive compound may be added to the resulting ceramic powder in accordance with purposes. The additive compound may be an oxide of Mo (molybdenum), Nb (niobium), Ta (tantalum), W (tungsten), Mn, V (vanadium), Cr (chromium) or a rare earth element, or an oxide of Co (cobalt), Ni, Li, B, Na, K and Si, or glass.

In the embodiment, it is preferable that ceramic particles structuring the dielectric layer 11 are mixed with compound including additives and are calcined in a temperature range from 820 degrees C. to 1150 degrees C. Next, the resulting ceramic particles are wet-blended with additives and are dried and crushed. Thus, a ceramic powder is obtained. For example, it is preferable that an average grain diameter of the resulting ceramic powders is 50 nm to 300 nm. For example, the grain diameter may be adjusted by crushing the resulting ceramic powder as needed. Alternatively, the grain diameter of the resulting ceramic power may be adjusted by combining the crushing and classifying.

Next, a cover material for forming the cover layer 13 is prepared. An additive compound may be added to ceramic powders of barium titanate obtained by the same process as the dielectric material, in accordance with purposes. The additive compound may be an oxide of Mn, V, Cr or a rare earth element, or an oxide of Co, Ni, Li, B, Na, K and Si, or glass. In the embodiment, the concentration of the rare earth element of the cover material with respect to the main component ceramic of the cover material is equal to or less than the concentration of the rare earth element of the dielectric material with respect to the main component ceramic of the dielectric material. And, the average ionic radius of the rare earth element of the cover material is equal to or less than the ionic radius of the rare earth element of the dielectric material.

In the embodiment, it is preferable that ceramic particles structuring the cover material are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powders is 50 nm to 300 nm as well as the dielectric material. The grain diameter may be adjusted by crushing the resulting ceramic powder as needed. Alternatively, the grain diameter of the resulting ceramic power may be adjusted by combining the crushing and classifying.

Next, a side margin material for forming the side margin region 16 is prepared. Additive compound may be added to ceramic powder of barium titanate obtained by the same process as the dielectric material, in accordance with purposes. The additive compound may be an oxide of Mn, V, Cr or a rare earth element, or an oxide of Co, Ni, Li, B, Na, K and Si, or glass. In the embodiment, the concentration of the rare earth element with respect to the main component ceramic of the side margin material is equal to or less than the concentration of the rare earth element with respect to the main component ceramic of the dielectric material. And the average ionic radius of the rare earth element of the side margin material is equal to or less than the average ionic radius of the rare earth element in the dielectric material. The cover material may be the same as the side margin material.

In the embodiment, it is preferable that ceramic particles structuring the side margin material are mixed with compound including additives and are calcined in a temperature range from 820 degrees C. to 1150 degrees C. Next, the resulting ceramic particles are wet-blended with additives, are dried and crushed. Thus, ceramic powder is obtained. For example, it is preferable that an average grain diameter of the resulting ceramic powders is 50 nm to 300 nm, as well as the dielectric material. The grain diameter may be adjusted by crushing the resulting ceramic powder as needed. Alternatively, the grain diameter of the resulting ceramic power may be adjusted by combining the crushing and classifying.

(Stacking Process)

Next, a binder such as polyvinyl butyral (PVB) resin, an organic solvent such as ethanol or toluene, and a plasticizer are added to the resulting dielectric material and wet-blended. With use of the resulting slurry, a stripe-shaped dielectric green sheet with a thickness of 1.0 μm or less is coated on a base material by, for example, a die coater method or a doctor blade method, and then dried.

Then, a pattern of the internal electrode layer 12 is provided on the surface of the dielectric green sheet by printing metal conductive paste for forming an internal electrode with use of screen printing or gravure printing. The conductive paste includes an organic binder. A plurality of patterns are alternatively exposed to the pair of external electrodes. The metal conductive paste includes ceramic particles as a co-material. A main component of the ceramic particles is not limited. However, it is preferable that the main component of the ceramic particles is the same as that of the dielectric layer 11. For example, $BaTiO_3$ having an average grain diameter of 50 nm or less may be evenly dispersed.

Then, the dielectric green sheet on which the internal electrode layer pattern is printed is stamped into a predetermined size, and a predetermined number (for example, 100 to 500) of stamped dielectric green sheets are stacked while the base material is peeled so that the internal electrode layers 12 and the dielectric layers 11 are alternated with each other and the end edges of the internal electrode layers 12 are alternately exposed to both end faces in the length direction of the dielectric layer 11 so as to be alternately led out to a pair of external electrodes 20a and 20b of different polarizations.

Next, a binder such as polyvinyl butyral (PVB) resin, an organic solvent such as ethanol or toluene, and a plasticizer are added to the cover material and wet-blended. With use of the resulting slurry, a stripe-shaped dielectric cover sheet with a thickness of 10 μm or less is coated on a base material by, for example, a die coater method or a doctor blade method, and then dried. The cover sheets, which are to be the cover layers 13, are compressed on the stacked dielectric green sheets and under the stacked dielectric green sheets. The resulting multilayer structure is cut into a predetermined size. In this case, the stacked structure has two end faces to which a plurality of internal electrode layer patterns are alternately exposed and two side faces to which all of the internal electrode layer patterns are exposed.

Next, a binder such as polyvinyl butyral (PVB) resin, an organic solvent such as ethanol or toluene, and a plasticizer are added to the side margin material and wet-blended. With use of the resulting slurry, a stripe-shaped side margin sheet with a thickness of 30 μm or less is coated on a base material by, for example, a die coater method or a doctor blade method, and then dried. The side margin sheets, which are to be the side margin region 16, are compressed on the two side faces of the stacked structure of the dielectric green sheets. The binder is removed from the resulting stacked structure in $N_2$ atmosphere of a temperature range of 250 degrees C. to 500 degrees C. After that, metal conductive paste to be the external electrodes 20a and 20b are coated on the both end of the stacked structure by a dipping method or the like and is dried. Thus, a compact of the multilayer ceramic capacitor 100 is obtained.

(Firing Process)

The resulting compact is fired for ten minutes to 2 hours in a reductive atmosphere having an oxygen partial pressure of $10^{-5}$ to $10^{-8}$ atm in a temperature range of 1100 degrees C. to 1300 degrees C. Thus, each compound is sintered and grown into grains. In this manner, it is possible to manufacture the multilayer ceramic capacitor 100.

(Re-Oxidizing Process)

After that, a re-oxidizing process may be performed in $N_2$ gas atmosphere in a temperature range of 600 degrees C. to 1000 degrees C.

(Plating Process)

After that, with a plating process, a metal such as Cu, Ni, and Sn may be coated on the external electrodes 20a and 20b.

In the embodiment, the concentration of the rare earth element in the active region 14 is equal to or more than the concentration of the rare earth element in the protective region. It is therefore possible to reduce the difference of densifying between the active region 14 and the protective region. In this case, even if the firing temperature is not excessively increased, it is possible to densify both the active region 14 and the protective region. It is therefore possible to suppress the reduction of the continuity modulus of the internal electrode layer 12 and improve the humidity resistance. The element promoting the densifying of the protective region may not be necessarily added. In this case, the diffusion of the additive element into the active region 14 is suppressed. It is therefore possible to suppress the degradation of the characteristic of the multilayer ceramic capacitor 100. The average ionic radius of the rare earth element in the active region 14 is equal to or more than the average ionic radius of the rare earth element in the protective region. In this case, the grain growth in the protective region is suppressed. Therefore, the grain growth of the active region 14 around the protective region is suppressed. Accordingly, it is possible to improve the reliability of the active region 14.

In the manufacturing method of the embodiment, the concentration of the rare earth element in the active region 14 is equal to or more than the concentration of the rare earth element in the protective region, and the average ionic radius of the rare earth element in the active region 14 is equal to or more than the average ionic radius of the rare earth element in the protective region. However, the relationships are not limited. At least one of the whole of the cover layer 13 and the whole of the side margin region 16 has only to satisfy the above-mentioned relationships.

Examples

The multilayer ceramic capacitors in accordance with the embodiment were made. And, property of the multilayer ceramic capacitors was measured.

(Making of the Dielectric Material)

Additive elements were added to barium titanate powder. The resulting barium titanate powder and the additive elements were sufficiently wet-blended with each other and crushed in a ball mill. Thus, the dielectric material was obtained. In examples 1, 2 and 4 and a comparative example 1, $Dy_2O_3$ was weighed so that a concentration of Dy with respect to 100 atm % of barium titanate powder was 1.0 atm %. In an example 3, $Ho_2O_3$ was weighed so that a concentration of Ho with respect to 100 atm % of barium titanate was 1.0 atm %. In a comparative example 2, $Ho_2O_3$ was weighed so that a concentration of Ho with respect to 100 atm % of barium titanate powder was 0.75 atm %. In a comparative example 3, $Dy_2O_3$ was weighed so that a concentration of Dy with respect to 100 atm % of barium titanate powder was 0.75 atm %. In the examples 1 to 4 and the comparative examples 1 to 3, MgO, $Mn_2O_3$ and $SiO_2$ were weighed so that a concentration of Mg, a concentration Mn and a concentration of Si with respect to 100 atm % of barium titanate powder were respectively 0.50 atm %, 0.10 atm % and 1.00 atm %.

(Making of the Cover Material and the Side Margin Material)

Additive elements were doped to barium titanate powder. The resulting barium titanate powder and the additive elements were sufficiently wet-blended with each other and crushed in a ball mill. Thus, the cover material and the side margin material were obtained. In the example 1, $Ho_2O_3$ was weighed so that a concentration of Ho with respect to 100 atm % of barium titanate powder was 0.75 atm %. In the example 2, $Ho_2O_3$ was weighed so that a concentration of Ho with respect to 100 atm % of barium titanate was 1.0 atm %. In the example 3, $Er_2O_3$ was weighed so that a concentration of Er with respect to 100 atm % of barium titanate powder was 1.0 atm %. In the example 4, $Dy_2O_3$ was weighed so that a concentration of Dy with respect to 100 atm % of barium titanate powder was 0.75 atm %. In the comparative example 1, $Ho_2O_3$ and $Gd_2O_3$ were weighed so that a concentration of Ho and a concentration of Gd with respect to 100 atm % of barium titanate powder were 0.5 atm % and 0.5 atm %. In the comparative example 2, $Dy_2O_3$ was weighed so that a concentration of Dy with respect to 100 atm % of barium titanate powder was 1.0 atm %. In the comparative example 3, $Ho_2O_3$ was weighed so that a concentration of Ho with respect to 100 atm % of barium titanate powder was 1.0 atm %. In the examples 1 to 4 and the comparative examples 1 to 3, MgO, $Mn_2O_3$ and $SiO_2$ were weighed so that a concentration of Mg, a concentration Mn and a concentration of Si with respect to 100 atm % of barium titanate powder were respectively 0.50 atm %, 0.10 atm % and 1.00 atm %.

(Making of the Multilayer Ceramic Capacitor)

Butyral acting as an organic binder, and toluene and ethyl alcohol acting as a solvent were added to the dielectric material. A dielectric green sheet was formed by a doctor blade method so that the thickness of the dielectric layers 11 after sintering became 1.0 µm. Conductive paste for forming an internal electrode was screen-printed on the resulting dielectric green sheet, and the internal electrode layer pattern was formed. 250 numbers of the dielectric green sheets on which the conductive paste for forming an internal electrode were stacked. Cover sheets were stacked on a lower face and an upper face of the stacked sheets. The thickness of the cover sheets was 30 Butyral acting as an organic binder, and toluene and ethyl alcohol acting as a solvent were added to the cover material. The cover sheets were formed by a doctor blade method. After that, the resulting multilayer structure was cut into a predetermined shape. Thereby, the two end faces to which a plurality of internal electrode layer patterns are alternately exposed and the two side faces to which all of the internal electrode layer patterns are exposed were formed. The side margin sheets are affixed to the two side faces. The binder was removed from the resulting stacked structure in $N_2$ atmosphere. Butyral acting as an organic binder, and toluene and ethyl alcohol acting as a solvent were added to the side margin material. The side margin sheets were formed by a doctor blade method. After that, Ni external electrodes were formed on the stacked structure by a dipping method. The resulting stacked structure was fired at a temperature of 1250 degrees C. in a reductive atmosphere ($O_2$ partial pressure: $10^{-5}$ to $10^{-8}$ atm). And sintered structure was formed. The sintered structure had a length of 0.6 mm, a width of 0.3 mm and a height of 0.3 mm. After re-oxidation of the sintered structure in $N_2$ atmosphere at a temperature of 800 degrees C., Cu, Ni and Sn were coated on the external electrodes by a plating. Thus, the multilayer ceramic capacitor was obtained. After the firing, the thickness of the internal electrode layer of Ni was 1.0 µm.

(Analysis)

The concentrations of the rare earth element of the active region 14 and the protective region were measured. LA-ICP-MS (Laser Abration Inductively Coupled Plasma-Mass Spectrometry) method was used. Table 2 shows the measured concentrations of the rare earth element. The average ionic radiuses were calculated from the measured concentrations and the ionic radiuses of Table 1. When the concentration of the rare earth element in the active region 14 is equal to or more than the concentration of the rare earth element in the protective region, the condition of the concentrations of the rare earth element in Table 2 was determined as good "○". When the concentration of the rare earth element in the active region 14 is less than the concentration of the rare earth element in the protective region, the condition of the concentrations of the rare earth element in Table 2 was determined as bad "x". When the average ionic radius of the rare earth element in the active region 14 was equal to or more than the average ionic radius of the rare earth element in the protective region, the condition of the average ionic radius of the rare earth element in Table 2 was determined as good "○". When the average ionic radius of the rare earth element in the active region 14 was less than the average ionic radius of the rare earth element in the protective region, the condition of the average ionic radius of the rare earth element in Table 2 was determined as bad "x". As shown in Table 2, in the examples 1 to 4, the condition of the concentration of the rare earth element and the condition of the average ionic radius of the rare earth element were determined as good "○". In the comparative example 1, the condition of the concentration of the rare earth element was determined as good "○", but the condition of the average ionic radius of the rare earth element was determined as bad "x". In the comparative example 2, both of the condition of the concentration of the rare earth element and the condition of the average ionic radius of the rare earth element were determined as bad "x". In the comparative example 3, the condition of the average ionic radius of the rare earth element was determined as good "○", but the condition of the concentration of the rare earth element was determined as bad "X"

teristic was determined as good "○". When the average life value was 100 min or less, the life characteristic was determined as bad "X". Table 3 shows the measured results.

TABLE 2

| | RARE EARTH ELEMENT IN ACTIVE REGION (atm %) | RARE EARTH ELEMENT IN PROTECTIVE REGION (atm %) | CONCENTRATION CONDITION OF RARE EARTH ELEMENT | AVERAGE IONIC RADIUS CONDITION OF RARE EARTH ELEMENT | DENSITY OF PROTECTIVE REGION (g/cc) |
|---|---|---|---|---|---|
| EXAMPLE 1 | Dy 1.0 | Ho 0.75 | ○ | ○ | 5.8 |
| EXAMPLE 2 | Dy 1.0 | Ho 1.0 | ○ | ○ | 5.9 |
| EXAMPLE 3 | Ho 1.0 | Er 1.0 | ○ | ○ | 5.9 |
| EXAMPLE 4 | Dy 1.0 | Dy 0.75 | ○ | ○ | 5.8 |
| COMPARATIVE EXAMPLE 1 | Dy 1.0 | Ho 0.5 Gd 0.5 | ○ | x | 5.7 |
| COMPARATIVE EXAMPLE 2 | Ho 0.75 | Dy 1.0 | x | x | 5.0 |
| COMPARATIVE EXAMPLE 3 | Dy 0.75 | Ho 1.0 | x | ○ | 5.1 |

Next, the density of the protective region (g/cc) was measured. Table 2 and Table 3 show the measured results. The higher the density of the protective region is, the higher the humidity resistance is. When the density was more than 5.5 g/cc, the humidity resistance was determined as good "○". When the density was equal to or less than 5.5 g/cc, the humidity resistance was determined as bad "x". In the examples 1 to 4 and the comparative example 1, the humidity resistance was determined as good "○". It is thought that this was because the condition of the concentration of the rare earth element was determined as good "○" in the examples 1 to 4 and the comparative example 1. On the other hand, in the comparative examples 2 and 3, the humidity resistance was determined as bad "X". It is thought that this was because the condition of the concentration of the rare earth element was determined as bad "x" in the comparative examples 2 and 3. The density of the protective region was calculated from an area ratio of a cavity, which was obtained by observing a cross section of the grinded multilayer ceramic capacitor by SEM (Scanning Electron Microscope).

In the examples 1 to 4 and the comparative examples 3, the life characteristic was determined as good "○". It is thought that this was because the condition of the average ionic radius of the rare earth element was good "○". On the other hand, in the comparative examples 1 and 2, the life characteristic was determined as bad "x". It is thought that this was because the average ionic radius of the rare earth element of the protective region was larger than the average ionic radius of the rare earth element of the active region 14, grain growth was promoted in the protective region, and grain growth was promoted in the part of the active region 14 near the protective region because of the influence of the protective region.

Figure 5:
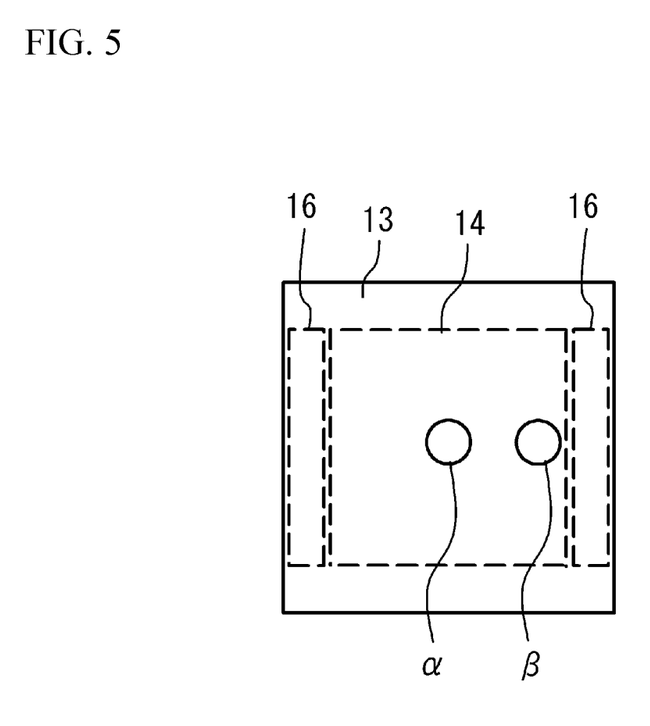
FIG. 5 illustrates measured a position of a crystal grain diameter.

And so, as illustrated in FIG. 5, a grain diameter of a ceramic crystal of a center region α of the active region 14 and a grain diameter of a ceramic crystal of a region β near the protective region were measured. Table 3 shows measured results. As shown in Table 3, there was not a large difference between the ceramic crystal grain diameter of the center region α of the active region 14 (grain diameters of

TABLE 3

| | HUMIDITY RESISTANCE | GRAIN DIAMETER OF ACTIVE REGION/ GRAIN DIAMETER NEAR PROTECTIVE REGION | LIFE VALUE | DETERMINATION |
|---|---|---|---|---|
| EXAMPLE 1 | ○ | 203/227 nm | ○(220 min) | ○ |
| EXAMPLE 2 | ○ | 205/210 nm | ○(328 min) | ○ |
| EXAMPLE 3 | ○ | 192/190 nm | ○(234 min) | ○ |
| EXAMPLE 4 | ○ | 207/204 nm | ○(166 min) | ○ |
| COMPARATIVE EXAMPLE 1 | ○ | 201/290 nm | x(90 min) GRAIN GROWTH NEAR PROTECTIVE REGION | x |
| COMPARATIVE EXAMPLE 2 | x | 211/283 nm | x(72 min) GRAIN GROWTH NEAR PROTECTIVE REGION | x |
| COMPARATIVE EXAMPLE 3 | x | 220/195 nm | ○(188 min) | x |

Next, life characteristic was measured. Regarding the life characteristic, life characteristic test was performed with respect to 20 samples of each of the examples 1 to 4 and the comparative examples 1 to 3. And, an average life value was measured. In the life characteristic test, a direct current voltage of 10 V was applied at 125 degrees C. A leak current was measured by a current meter. And a time until breakdown occurs was determined as a life value. When the average life value was more than 100 min, the life characthe active region in Table 3) and the ceramic crystal grain diameter of the region β near the protective region (grain diameters of the protective region in Table 3), in the examples 1 to 4 and the comparative example 3. In this manner, in the examples 1 to 4 and the comparative example 3, it was confirmed that the grain growth was suppressed in the active region 14. On the other hand, in the comparative examples 1 and 2, the ceramic crystal grain diameter of the region β near the protective region was greatly larger than that of the center region α in the active region 14. In this manner, it was confirmed that the grain growth was promoted in the region β of the active region 14, in the comparative examples 1 and 2.

Although the embodiments of the present invention have been described in detail, it is to be understood that the various change, substitutions, and alterations could be made hereto without departing from the spirit and scope of the invention.

What is claimed is:

1. A multilayer ceramic capacitor comprising:
a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing the second end face,
wherein a concentration of a rare earth element in an active region with respect to a main component ceramic of the active region is equal to or more than a concentration of a rare earth element in at least a part of a protective region with respect to a main component ceramic of the protective region,
wherein the active region is a region in which a set of internal electrode layers exposed to the first end face of the multilayer structure face another set of internal electrode layers exposed to the second end face of the multilayer structure,
wherein the protective region includes a cover layer and a side margin,
wherein the cover layer is provided on at least one of an upper face and a lower face of the multilayer structure in a stacking direction of the multilayer structure, a main component of the cover layer being a same as that of the dielectric layers,
wherein, in the multilayer structure, the side margin covers edge portions to which the plurality of internal electrode layers extend toward two side faces other than the first end face and the second end face,
wherein an average ionic radius of the rare earth element of the at least a part of the protective region is less than an average ionic radius of the rare earth element in the active region,
wherein the concentration of rare earth elements in the protective region with respect to the main component ceramic is 0.5 atm % or more and 2.0 atm % or less, and
wherein a density of the protective region is more than 5.5 g/cc.

2. The multilayer ceramic capacitor as claimed in claim 1, wherein an average thickness of the dielectric layers is 1 μm or less.

3. The multilayer ceramic capacitor as claimed in claim 1, wherein the at least a part of the protective region is one of a whole of the cover layer and a whole of the side margin.

4. The multilayer ceramic capacitor as claimed in claim 1, wherein the main component ceramic of the dielectric layers and the protective region is barium titanate.

5. The multilayer ceramic capacitor as claimed in claim 1, wherein the rare earth element added to the active region is at least one of Gd, Tb, Dy, Ho, Er, Y and Yb, and
wherein the rare earth element added to the protective region is at least one of Gd, Tb, Dy, Ho, Er, Y and Yb.

6. A manufacturing method of the multilayer ceramic capacitor of claim 1, comprising:

a first process of forming a stack unit by providing a pattern of metal conductive paste on a green sheet having grains of main component ceramic which corresponds to the main component ceramic of the active region;
a second process of stacking a plurality of the stack units formed in the first process in a manner that positions of the patterns are alternately shifted to each other so that the plurality of internal electrode layers are alternately exposed to the first end face and the second end face of the multilayer structure of the multilayer ceramic capacitor; and
a third process of providing a cover sheet on at least one of an upper face and a lower face in a stacking direction of a ceramic multilayer structure obtained in the second process which corresponds to the multilayer structure of the multilayer ceramic capacitor, the cover sheet corresponding to the cover layer and including grains of main component ceramic which is the same as the main component ceramic of the active region, said third process further comprising providing the side margin of the multilayer structure of the multilayer ceramic capacitor, forming the protective region together with the cover layer,
wherein a concentration of a rare earth element in the green sheet with respect to the main component ceramic of the green sheet is equal to or more than a concentration of a rare earth element in the cover sheets with respect to the main component ceramic of the cover so that the concentration of the rare earth element in the active region with respect to the main component ceramic of the active region is equal to or more than the concentration of the rare earth element in at least the part of the protective region with respect to the main component ceramic of the protective region, said concentration of the rare earth elements in the protective region with respect to the main component ceramic being 0.5 atm % or more and 2.0 atm % or less,
wherein an average ionic radius of the rare earth element of the cover sheets and/or an average ionic radius of the rare earth element of the side margin sheet are/is less than an average ionic radius of the rare earth element of the green sheet so that the average ionic radius of the rare earth element of the at least a part of the protective region is less than the average ionic radius of the rare earth element in the active region, and
wherein a density of the protective region is more than 5.5 g/cc.

7. A multilayer ceramic capacitor comprising:
a multilayer structure in which each of a plurality of dielectric layers and each of a plurality of internal electrode layers are alternately stacked, a main component of the dielectric layers being ceramic, the multilayer structure having a rectangular parallelepiped shape, the plurality of internal electrode layers being alternately exposed to a first end face and a second end face of the multilayer structure, the first end face facing the second end face,
wherein a concentration of a rare earth element in an active region with respect to a main component ceramic of the active region is equal to or more than a concentration of a rare earth element in a side margin with respect to a main component ceramic of the side margin,
wherein the active region is a region in which a set of internal electrode layers exposed to the first end face of the multilayer structure face another set of internal electrode layers exposed to the second end face of the multilayer structure, wherein, in the multilayer structure, the side margin covers edge portions to which the plurality of internal electrode layers extend toward two side faces other than the first end face and the second end face, and wherein an average ionic radius of the rare earth element of the side margin is less than an average ionic radius of the rare earth element in the active region.

8. The multilayer ceramic capacitor as claimed in claim 1, wherein the rare earth element in the protective region is holmium (Ho) where the rare earth element in the active region is dysprosium (Dy), and the rare earth element in the protective region is erbium (Er) where the rare earth element in the active region is holmium (Ho).

9. The multilayer ceramic capacitor as claimed in claim 7, wherein the rare earth element in the side margin is holmium (Ho) where the rare earth element in the active region is dysprosium (Dy), and the rare earth element in the side margin is erbium (Er) where the rare earth element in the active region is holmium (Ho).

\* \* \* \* \*